(12) United States Patent
Hawkins

(10) Patent No.: US 6,516,552 B2
(45) Date of Patent: Feb. 11, 2003

(54) REUSABLE SPOON BILL FOR ARTIFICIAL AND NATURAL BAIT FISH

(76) Inventor: Brian J. Hawkins, 39519 Coral Sky Ct., Murrieta, CA (US) 92563

( * ) Notice: Subject to any disclaimer, the term of this patent is extended or adjusted under 35 U.S.C. 154(b) by 0 days.

(21) Appl. No.: 10/083,247

(22) Filed: Feb. 23, 2002

(65) Prior Publication Data

US 2002/0121043 A1 Sep. 5, 2002

Related U.S. Application Data

(60) Provisional application No. 60/269,406, filed on Feb. 20, 2001.

(51) Int. Cl.$^7$ ............................................. A01K 85/00
(52) U.S. Cl. ..................... 43/42.09; 43/44.2; 43/43.14
(58) Field of Search ..................... 43/42.09, 42.35, 43/44.2, 44.8, 43.14

(56) References Cited

U.S. PATENT DOCUMENTS

| | | | | |
|---|---|---|---|---|
| 2,207,319 A | * | 7/1940 | Hollopeter | 43/44.6 |
| 4,067,135 A | * | 1/1978 | Martin | 43/43.14 |
| 4,133,132 A | * | 1/1979 | Ellis et al. | 43/41 |
| 4,848,023 A | * | 7/1989 | Ryder et al. | 43/44.2 |
| 5,893,232 A | * | 4/1999 | Horton et al. | 43/42.35 |

* cited by examiner

*Primary Examiner*—Charles T. Jordan
*Assistant Examiner*—Bret Hayes
(74) *Attorney, Agent, or Firm*—Donald W. Meeker

(57) ABSTRACT

A plastic spoon bill, oval or circular in plan view with two angled thin faces which may be flat or curved, has a horizontal insert in the mouth of an artificial or natural bait fish. A pin through the bait fish body and through a hole in the insert secures the insert. A multiple pronged hook on a wire leader from the spoon bill is inserted in the underside of the bait fish. A weighted ballast attached to the hook is inserted in the underside of the bait fish. A live fish being hooked pulls the hook from the bait fish and the undamaged bait fish is reusable.

11 Claims, 2 Drawing Sheets

REUSABLE SPOON BILL FOR ARTIFICIAL AND NATURAL BAIT FISH

CLAIM OF PROVISIONAL APPLICATION RIGHTS

This application claims the benefit of U.S. Provisional Patent Application No. 60/269,406, filed on Feb. 20, 2001.

BACKGROUND OF THE INVENTION

1. Field of the Invention

The present invention relates to fish lures and in particular to a spoon bill and hook on a wire leader that removably attaches to an artificial fabricated rubberized simulated bait fish or an actual natural bait fish to simulate a swimming motion in the bait fish and after the fish is caught the hook and wire leader detaches from the bait fish thereby saving the bait fish to be reused.

2. Description of the Prior Art

Catching fish relies on using a bait and hook simulating the food that fish normally feed on so that the feeding fish will attempt to eat the bait and hook and the fish will be hooked and pulled in on a fishing line.

Many fish feed on smaller fish called bait fish. Fishing lures to simulate small fish very often don't even look like a real fish nor do they simulate the movement of the fish. They often just attempt to attract a feeding fish by making some movement, not swimming movement, or just by the glitter of the lure.

A number of attempts have been made to create fishing lures and hooks that will be effective in attracting and catching fish.

U.S. Pat. No. 5,182,875, issued Feb. 2, 1993 to Righetti, provides a flexible fishing lure having a segmented body connected by a thin flexible membrane and a diving bill, which produces a serpentine motion in the water. The fishing line is attached to a loop on the front of the bill and the hooks are attached to the fish body.

U.S. Pat. No. 5,893,232, issued Apr. 13, 1999 to Horton et al, shows a natural bait holding fishing lure for use with dead bait fish, the lure having a plastic minnow head with a protruding metal tongue-shaped foil in front which deflects water to simulate the swimming motion of a live minnow. The device has a tube inserted in the minnow's mouth and a pivoting barbed locking pin on top and a fish hook below engaging the underside.

U.S. Pat. Nos. 6,058,643 and 6,052,938, issued May 9, 2000 and Arp. 25, 2000 to Marusak et al, claim a modular fishing lure kit with a soft fish-like body having a spoon-like lip that snaps into the front of the lure.

U.S. Pat. No. 5,992,083, issued Nov. 30. 1999 to Deng et al, describes a flexible segmented fishing lure kit with parts that can be assembled to form the lure including a crank bait lip which can be secured at the front under the head.

U.S. Pat. No. 5,815,978, issued Oct. 6, 1998 to Huddleston, discloses a soft bait fish lure having a hard rigid head portion with a diving plate and an attached soft flexible body and tail portion.

U.S. Pat. No. 4,848,023, issued Jul. 18, 1989 to Ryder et al, indicates a fishing lure for use with dead bait fish, having a front cover head portion with a foil or diving plane which deflects water to create lateral motion of the lure and bait fish to simulate swimming.

U.S. Pat. No. 3,412,500, issued Nov. 26, 1968 to Lahtinen, puts forth a fish lure with a flexible fish-shaped body having a pivoted spoon-like lip on the front to simulate the swimming movement of a bait fish.

U.S. Pat. No. 5,168,652, issued Dec. 8, 1992 to Davis, concerns a line tie for an artificial fish lure having a fish shaped body with a diving lip on the front having a loop pivotally attached to the diving lip for attaching the line so the lure can move freely from side to side when dragged through the water to simulate swimming.

U.S. Pat. No. 5,638,632, issued Jun. 17, 1997 to Smith, illustrates an artificial fishing lure having an S-shaped body and a front diving lip to simulate swimming movement.

A number of design patents including U.S. Pat. Nos. D254,026, D270,751, D296,811, D345,003, D364,670, D299,264, D377,384, and D396,261, all show fishing lures with downwardly protruding lips or bills in the front end of a fish-shaped lure.

None of the prior art patents provide a fishing lure having an attachable plastic spoon bill with the hook and wire leader attached to the bait fish separately from the spoon bill so that the hook and wire leader pulls away from the bait fish when the live fish is hooked. Nor do the prior art patent provide having the spoon bill attachable with a pin and insertion shaft to either a soft artificial bait fish or an actual natural bait fish. None of the prior art patents provide a properly shaped spoon bill with a weighted ballast in the bait fish for a more realistic swimming motion in the bait fish.

SUMMARY OF THE INVENTION

An object of the present invention is to provide a spoon bill and attached wire leader and hook that are attachable to an artificial fabricated rubberized bait fish or to an actual natural bait fish to simulate a swimming motion in the bait fish.

Another object of the present invention is to provide a swimming simulating attachable spoon bill and attached wire leader and hook that detach from the bait fish when a live fish is hooked, thereby saving the lure or bait fish to be used again.

One more object of the present invention is to provide an angled spoon bill with a ballast weight in the bottom of the bait fish to more effectively simulate the actual swimming motion of a fish. And further, with the ballast weight connected at the intersection of the wire leader and hook, to use that ballast weight inserted with a tight friction fit into a hole in the bait fish to secure the line end of the hook to the body of the bait fish while the hook end is hooked into the bait fish.

An additional object of the present invention is to provide a spoon bill with an insertion portion that is inserted in the mouth of the bait fish and secured therein by a pin inserted through the body of the bait fish and into a hole in the insertion portion to insure that the spoon bill stays attached to the bait fish.

In brief, a plastic spoon bill with an angular bend and a hook apparatus, having a wire leader from the spoon bill with the hook attached at the end, are attached to an artificial fabricated rubberized bait fish or an actual natural dying or dead bait fish to create a unique bait fish fishing lure which accurately simulates a swimming fish. It looks and acts like an actual swimming bait fish.

The hook apparatus detaches from the bait fish when a live fish attempting to eat the bait fish is hooked, thereby saving the bait fish to be reused.

The spoon bill has a horizontal insertion portion inserted into the mouth of the bait fish and secured therein with a pin through the body of the bait fish fitting through a hole in the insertion portion to secure the insertion portion in place. A downwardly angled spoon bill portion, bent forward and having preferably a circular shape or an oval shape wider at the bottom and having an upward bend at the bottom extends forward out of the mouth of the bait fish to create a natural swimming motion in the bait fish as it is pulled through the water on a fishing line attached to the top of the spoon bill portion.

Attached under the top of the spoon bill portion is a short wire leader, approximately half the length of the bait fish, with a fishing hook at the end of the wire leader. The fishing hook is inserted into the underside or belly of the bait fish. A weighted plug attached at the intersection of the wire leader and the fishing hook is inserted into a hole made in the belly of the bait fish to further secure the hook flat against the bait fish and to assist as a weighted ballast in the simulation of the swimming movement of the bait fish.

An advantage of the present invention is that it has a spoon bill that creates a simulated swimming movement in a fabricated or actual bait fish and then has a wire leader and hook attached to the spoon bill that separates from the bait fish upon hooking a live fish to preserve the bait fish for reuse.

Another advantage of the present invention is that it provides a spoon bill in front of the bait fish and a weighted ballast in the underside of the bait fish to create a realistic swimming motion in the bait fish and thereby act as a more effective bait fish fishing lure to catch fish. The invention may be fabricated in various sizes to fit different types of bait fish.

A further advantage of the present invention is that it may be used with an artificial fabricated bait fish or an actual natural bait fish.

BRIEF DESCRIPTION OF THE DRAWINGS

These and other details of my invention will be described in connection with the accompanying drawings, which are furnished only by way of illustration and not in limitation of the invention, and in which drawings.

BEST MODE FOR CARRYING OUT THE INVENTION

Figure 1:
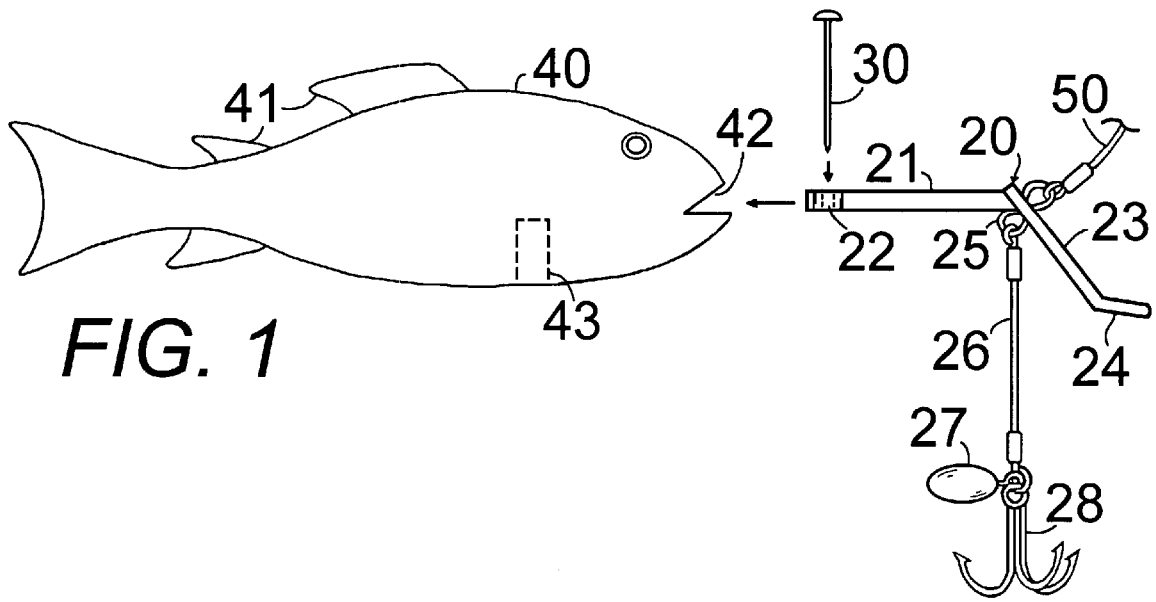
FIG. 1 is a side elevational view of the components of the invention aligned for installation on the bait fish.
Figure 2:
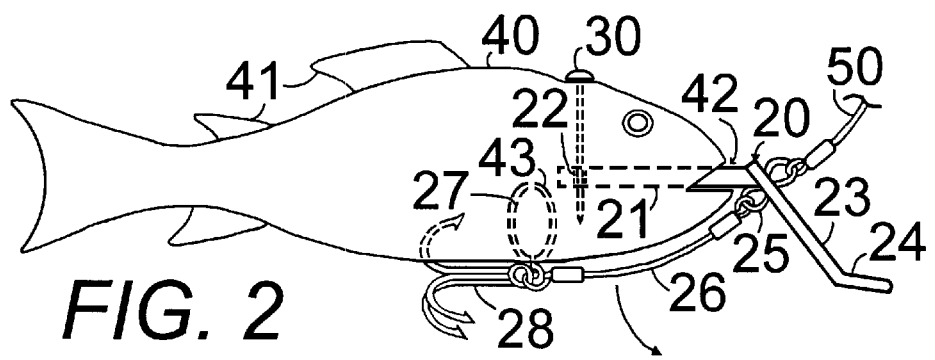
FIG. 2 is a side elevational view of the components of the invention installed on the bait fish.
Figure 3:
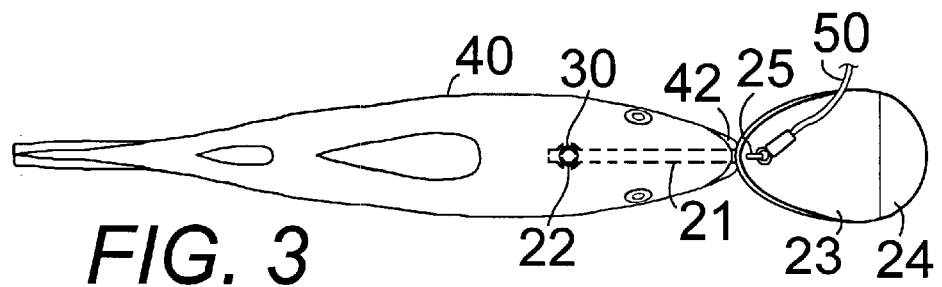
FIG. 3 is a top plan view of the components of the invention installed on the bait fish.

In FIGS. 1, 2 and 3, a reusable bait fish spoon bill simulates swimming motion in a bait fish. The reusable bait fish spoon bill comprises a spoon bill 20 having a horizontal insertion portion 21 provided with an opening 22 therethrough, a downwardly angled spoon bill portion 23 and 24 rigidly attached to the insertion portion 21 and a means for receiving a fishing line, such as holding loops 25, interlocking snaps or other holding means, attached to the spoon bill, wherein the insertion portion 21 is positioned within a mouth opening 42 of an artificial fabricated rubberized bait fish 40 which simulates an actual bait fish with a mouth opening 42 and fins 41 or inserted in the mouth of a real natural dying or dead bait fish (not shown). The insertion portion 21 is secured in the mouth opening 42 by the insertion of a pin 30 through the bait fish body 40, preferably from a top side of the bait fish, and into the opening 22 in the insertion portion 21.

A hook apparatus comprising a wire leader 26 attached to the spoon bill through a holding loop 25, interlocking snap or other means and a fish hook 28 attached to an end of the wire leader 26, the fish hook 28 is capable of being hooked into the bait fish 40 and further capable of separating from the bait fish (as indicated by the arched arrow in FIG. 2) upon hooking a live fish to enable the reuse of the bait fish 40.

As indicated, the reusable bait fish spoon bill can be used either with a natural bait fish or a fabricated rubberized bait fish 40 simulating a natural bait fish, and the invention produces the natural swimming motion in both types of bait fish.

Figure 4:
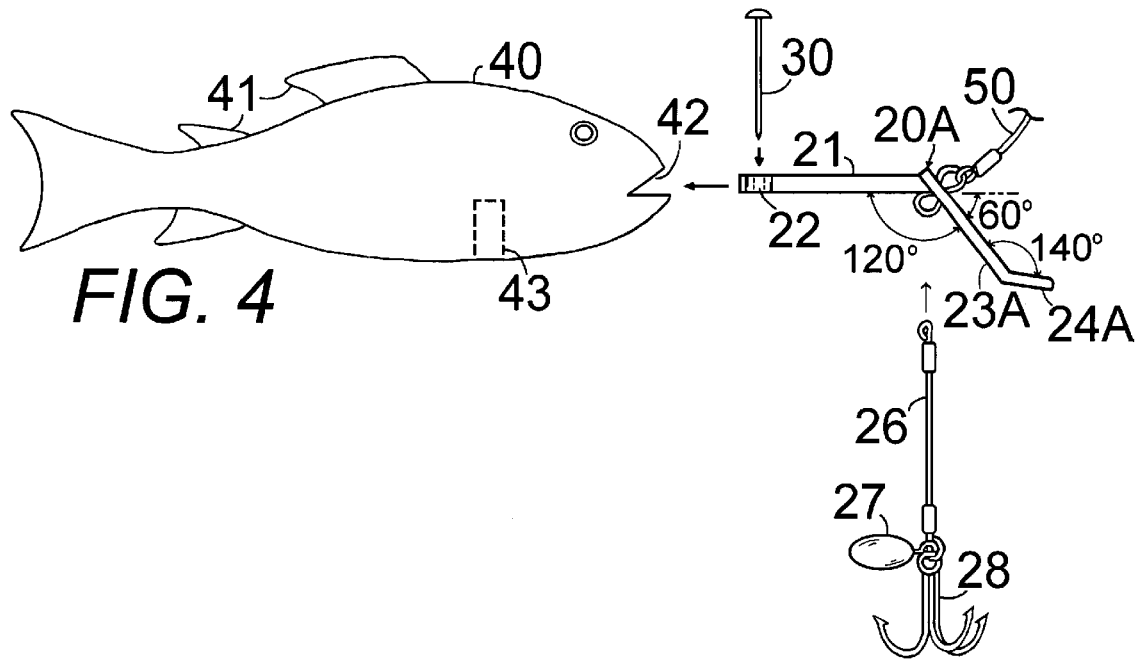
FIG. 4 is a side elevational view of the components of the invention aligned for installation on the bait fish showing the angles of the preferred embodiment of the invention.
Figure 5:
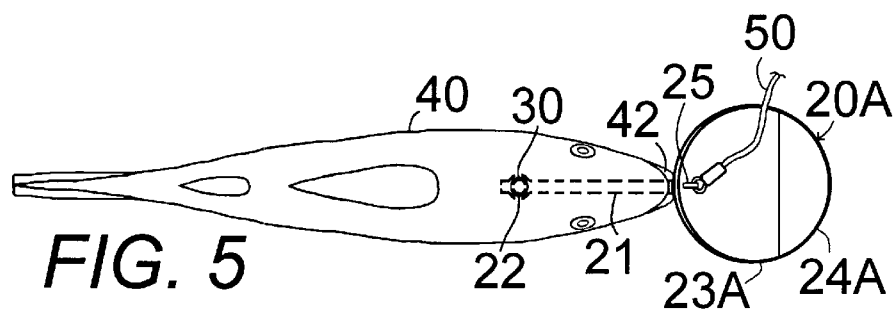
FIG. 5 is a top plan view of the components of the invention installed on the bait fish showing the preferred circular shape embodiment of the spoon bill.
Figure 6:
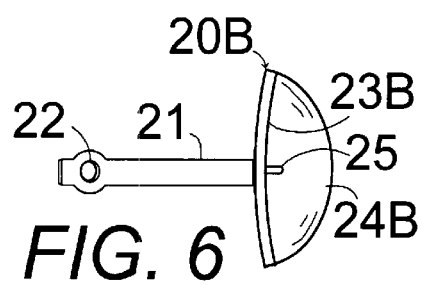
FIG. 6 is a top perspective of an alternate embodiment of the spoon bill looking at the top portion of the spoon on edge showing its curved face.

The downwardly angled spoon bill portion 23 and 24 comprises an oval curved shape spoon bill 23 and 24 in plan view, in FIG. 3, or a circular curved shape spoon bill 23A and 24A in plan view (the preferred embodiment), in FIG. 5, having a top spoon portion 23 and 23A attached to the insertion portion 21 and the fishing line 50 and having a bottom spoon portion 24 and 24A angled upwardly relative to the top spoon portion 23. Both the top spoon portion 23 and 23A and the bottom spoon portion 24 and 24A having thin flat faces as seen in FIGS. 1–5 or thin curved faces 23B and 24B, is seen in FIG. 6. This is the optimum shape for creating a natural swimming motion in the bait fish.

In FIG. 4 the preferred angle of the top spoon portion 23A is 120° from the insertion portion 21, measured from the bottom of the insertion portion to the bottom face of the top spoon portion, or 60° from the horizontal to the face of the top spoon portion 23A. The preferred angle of the bend between the face of the top spoon portion 23A and the face of the bottom spoon portion 24A is 140°. These angles provide the optimum simulation of actual swimming.

In FIGS. 1 and 2 a weighted ballast 27 is attached to a bottom side of the bait fish 40 to maintain the bait fish in a natural vertical position and assist in simulating the natural movement of a fish. The bait fish 40 has a ballast opening 43 in an underside of the bait fish and the weighted ballast 27 is attached adjacent to a connecting point between the wire leader 26 and the fish hook 28 so that the weighted ballast 27 is insertable in the ballast opening 43 in the bottom side of the bait fish and further serves to hold the fish hook 28 against the bait fish 40. In an artificial rubberized fabricated bait fish 40, the ballast hole is formed in the molding of the bait fish 40. In a natural bait fish the ballast hole may be made by slicing open the bait fish. The ballast hole 43 is formed slightly smaller than the weighted ballast 27 so that the weighted ballast 27 fits securely with a tight friction fit for trawling the bait fish. Then when a live fish is hooked the weighted ballast 27 is easily pulled by the live fish from the ballast hole 43 so the bait fish is not damaged in catching the live fish and the bait fish can be reused.

The fish hook 28 is a multiple pronged hook element with at least two prongs, and preferably three prongs interconnected. One of the prongs is inserted in the underside of the bait fish 40, as seen in FIG. 2 and the at least one other prong, preferably two prongs, protrude outwardly to hook the live fish. Upon being hooked, the live fish pulls the hook 28 away from the bait fish so the bait fish is left relatively undamaged for reuse.

The spoon bill 20 is preferably fabricated of molded plastic for speed, efficiency and economy of production. The fish line 50 and wire leader 26 and holding loops 25 and hook 28 are standard fishing equipment materials. The pin 30 is preferably a metal pin or nail.

It is understood that the preceding description is given merely by way of illustration and not in limitation of the invention and that various modifications may be made thereto without departing from the spirit of the invention as claimed.

What is claimed is:

1. A reusable bait fish spoon bill device that simulates swimming motion in a bait fish, the device comprising:

a spoon bill having a horizontal insertion portion provided with an opening therethrough, a downwardly angled spoon portion rigidly attached to the insertion portion and a means for receiving a fishing line attached to the spoon bill, wherein the insertion portion is positioned within a mouth of a bait fish and secured therein by the insertion of a pin through the bait fish body and into the opening in the insertion portion;

a hook apparatus comprising a wire leader attached to the spoon bill and a fish hook attached to an end of the wire leader, the fish hook capable of being hooked into the bait fish and further capable of separating from the bait fish upon hooking a live fish to enable the reuse of the bait fish;

wherein the reusable fishing lure bill device can be used alternately with a natural bait fish and a fabricated bait fish simulating a natural bait fish.

2. The device of claim 1 wherein the downwardly angled spoon portion comprises a curved shape spoon bill having a top spoon portion attached to the insertion portion the fishing line and a bottom spoon portion angled upwardly relative to the top spoon portion, both the top spoon portion and the bottom spoon portion having thin flat faces.

3. The device of claim 1 wherein the downwardly angled spoon portion comprises a curved shape spoon bill having a top spoon portion attached to the insertion portion the fishing line and a bottom spoon portion angled upwardly relative to the top spoon portion, both the top spoon portion and the bottom spoon portion having thin curved faces.

4. The device of claim 2 wherein the spoon bill spoon portion has a circular shape in plan view.

5. The device of claim 2 wherein the spoon bill spoon portion has an oval shape in plan view.

6. The device of claim 2 wherein an upper face of the top spoon portion is angled downwardly 60° from the horizontal.

7. The device of claim 2 wherein an upper face of the bottom spoon portion is angled away from an upper face of the top spoon portion by 140°.

8. The device of claim 1 further comprising a weighted ballast attached to a bottom side of the bait fish to maintain the bait fish in a natural vertical position and assist in simulating the natural movement of a fish.

9. The device of claim 8 wherein bait fish has an opening in an underside of the bait fish and the weighted ballast is attached adjacent to a connecting point between the wire leader and the fish hook so that the weighted ballast is insertable in the opening in the bottom side of the bait fish and further serves to hold the fish hook against the bait fish.

10. The device of claim 9 wherein the bait fish is a fabricated rubberized bait fish having a built-in mouth opening to receive the insertion portion of the spoon bill and a builtin underside opening to receive the weighted ballast.

11. The device of claim 1 wherein the fish hook is a multiple pronged hook element with at least two prongs interconnected, one of the prongs being inserted in the underside of the bait fish and the at least one other prong protruding outwardly to hook the live fish.

* * * * *